No. 852,958. PATENTED MAY 7, 1907.
W. B. HUGHES.
GAS PRODUCER.
APPLICATION FILED OCT. 15, 1906.
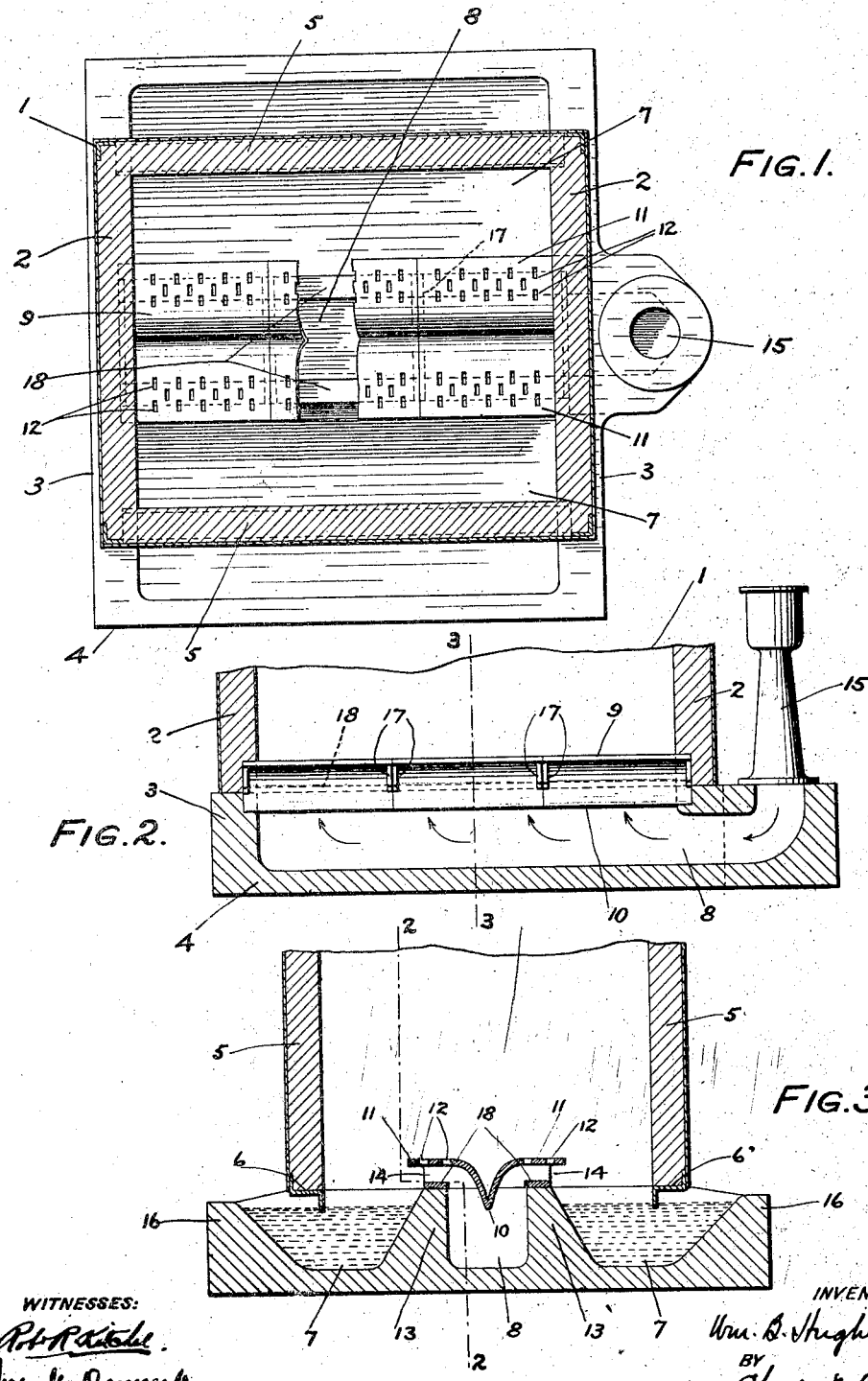

UNITED STATES PATENT OFFICE.

WILLIAM B. HUGHES, OF CLEVELAND, OHIO.

GAS-PRODUCER.

No. 852,958.          Specification of Letters Patent.          Patented May 7, 1907.

Application filed October 15, 1906. Serial No. 338,957.

*To all whom it may concern:*

Be it known that I, WILLIAM B. HUGHES, a citizen of the United States, residing in the city of Cleveland, county of Cuyahoga, and State of Ohio, have invented certain Improvements in Gas-Producers, of which the following is a specification.

This invention is a gas producer having as its principal object to provide a simple, inexpensive and efficient construction, comprising a body supported by an artificial stone base having a channel therein with deflecting means for distributing air to the interior of the body, and channels for holding water to provide a seal for the lower part of the body dipping therein, the body being preferably rectangular in cross section and the channels parallel to the sides of the body.

In the accompanying drawings, Figure 1 represents a sectional plan view of the invention; Fig. 2 represents a vertical sectional view thereof taken on the line 2—2 of Fig. 3, and Fig. 3 represents a vertical sectional view taken on the line 3—3 of Fig. 2.

As shown in the drawings, the rectangular body 1 has the end walls 2 supported upon the end walls 3 of the base 4, and the side walls 5 supported by the Z-bars 6 which rest upon the end walls and depend into the parallel channels 7 in the base. An air channel 8 is formed in the base between and parallel to the water channels 7, and the deflector 9, comprising the depending V-shaped spreader 10 terminating in the horizontally disposed wings 11 with the perforations 12 therein, is supported upon the walls 13 between the air and water channels so as to provide lateral passages 14 for distributing the air introduced into the channel 8 by the blower 15. The base thus formed is of concrete or artificial stone, with the end walls 3, the interior walls 13 and the exterior walls 16 forming the parallel air and water channels formed integrally therewith, being inexpensive, easily made, light, enduring and efficient.

The deflector, extending across the base through the center of the body above the air channel, is preferably made in sections, having thereon vertical, laterally disposed brackets or webs 17 connected by plates 18 resting on the walls 13, being of inexpensive construction and readily replaced.

Having described my invention, I claim:—

1. A gas producer having an artificial stone base with artificial stone walls forming an air channel extending transversely across the producer chamber and a water channel on each side of said air channel, said walls being disposed so as to act as separators for the air and water.

2. A gas producer having an artificial stone base with artificial stone walls forming an air channel extending transversely across the producer chamber and a water channel on each side of said air channel, said walls being disposed so as to separate the air and water, and a deflector supported by said walls, said deflector comprising a depending spreader terminating in wings.

In testimony whereof I have hereunto set my name this sixth day of October, 1906, in the presence of the subscribing witnesses.

WM. B. HUGHES.

Witnesses:
   ELI S. SANDERSON,
   EDW. J. FISHER.